United States Patent
Yague et al.

(10) Patent No.: US 11,968,162 B1
(45) Date of Patent: *Apr. 23, 2024

(54) MESSAGE CONTENT CLEANSING

(71) Applicant: Wells Fargo Bank, N.A., San Francisco, CA (US)

(72) Inventors: Ibrahima Yague, Phoenix, AZ (US); Ying Jessica Zhao, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,059

(22) Filed: Oct. 21, 2021

Related U.S. Application Data

(63) Continuation of application No. 16/815,735, filed on Mar. 11, 2020, now Pat. No. 11,184,313, which is a continuation of application No. 14/925,631, filed on Oct. 28, 2015, now Pat. No. 10,630,631.

(51) Int. Cl.
  *H04L 51/23* (2022.01)
  *G06Q 10/107* (2023.01)
  *H04L 51/212* (2022.01)

(52) U.S. Cl.
  CPC ........... *H04L 51/23* (2022.05); *G06Q 10/107* (2013.01); *H04L 51/212* (2022.05)

(58) Field of Classification Search
  CPC ...... G06Q 10/107; H04L 51/212; H04L 51/23
  See application file for complete search history.

(56) References Cited

U.S. PATENT DOCUMENTS

| | | |
|---|---|---|
| 6,654,788 B1 | 11/2003 | Chance et al. |
| 6,757,830 B1 | 6/2004 | Tarbotton et al. |
| 7,222,299 B1 | 5/2007 | Lim et al. |
| 8,010,466 B2 | 8/2011 | Patinkin |
| 8,095,547 B2 | 1/2012 | Jeong et al. |

(Continued)

OTHER PUBLICATIONS

Carvalho, Vitor R., and William W. Cohen. "Learning to extract signature and reply lines from email." Proceedings of the Conference on Email and Anti-Spam. vol. 2004. Whole Document. (Year: 2004).*

(Continued)

*Primary Examiner* — Thomas J Dailey
(74) *Attorney, Agent, or Firm* — Merchant & Gould P.C.

(57) ABSTRACT

A message is monitored to determine whether a response is required based on message compliance regulations. The monitoring of the message comprises automatically identifying one or more parts of the message that are not relevant to the monitoring of the message based on the message compliance regulations; automatically excluding the one or more parts of the message that are not relevant from the monitoring of the message based on the message compliance regulations; identifying content in a part of the message that is not excluded from the monitoring of the message that can indicate that a response is required based on the message compliance regulations. When the content that can indicate that a response is required based on the message compliance regulations is discovered in the part of the message that is not excluded from the monitoring of the message, the message is automatically designated for further analysis.

18 Claims, 7 Drawing Sheets

(56) References Cited

U.S. PATENT DOCUMENTS

| | | | |
|---|---|---|---|
| 8,145,710 | B2 | 3/2012 | Cowings et al. |
| 8,515,894 | B2 | 8/2013 | Yu |
| 8,880,617 | B2 | 11/2014 | Mankiewicz |
| 9,489,378 | B1 | 11/2016 | Uszkoreit et al. |
| 2008/0244750 | A1 | 10/2008 | Romero |
| 2009/0182872 | A1 | 7/2009 | Hong |
| 2010/0205123 | A1 | 8/2010 | Sculley et al. |
| 2012/0054135 | A1 | 3/2012 | Salaka et al. |
| 2012/0245937 | A1 | 9/2012 | Thenthiruperai et al. |
| 2012/0254333 | A1 | 10/2012 | Chandramouli et al. |
| 2013/0060863 | A1 | 3/2013 | D'Eri et al. |
| 2013/0346528 | A1 | 12/2013 | Shinde et al. |
| 2014/0280623 | A1* | 9/2014 | Duan ............... H04L 51/02 709/206 |
| 2015/0032829 | A1 | 1/2015 | Barshow et al. |
| 2016/0307110 | A1 | 10/2016 | Catanzano |

OTHER PUBLICATIONS

Wanli, M. et al., A Novel Spam Email Detection System Based on Negative Selection, 2009 Fourth International Conference on Computer Sciences and Convergence Information Technology, University of Canberra, Canberra, Australia, 2009, 6 pages.

Sebastiani, F., Machine Learning in Automated Text Categorization, Consiglio Nazionale delle Ricerche, Italy, Oct. 26, 2001, 55 pages.

"Naive Bayes classifier" (Oct. 12, 2014). Wikipedia. Accessed: https://en.wikipedia.org/w/index.php?title=Naive_Bayes_classifier&oldid=629263110 (Year: 2014).

* cited by examiner

300 ↘

302 — Sent:
303 — From:
304 — To:
306 — Cc:
308 — Subject: RE: Discussion

310 ↘

New Message Content

312 — Name
314 — Title
316 — Address

318 — Telephone
320 — Fax
322 — Email
324 — URL

326 — LOGO

328 — Cities

330 — Disclaimer

332 ↘ Signature Block

334 ↘

Echo Content

GUARDIANS OF GREAT IDEAS®

328 ⬉

Atlanta | Denver | Knoxville | Minneapolis | New York | Washington D.C.

330 ⬉

Note: This email message is confidential and may be privileged or otherwise protected by law. If you are not the intended recipient, please: (1) reply via email to sender; (2) destroy this communication entirely; including deletion of all from copying or disseminating this communication by any means whatsoever. associated text files from all individual and network storage devices; and (3) refrain Thank you.

FIG. 5

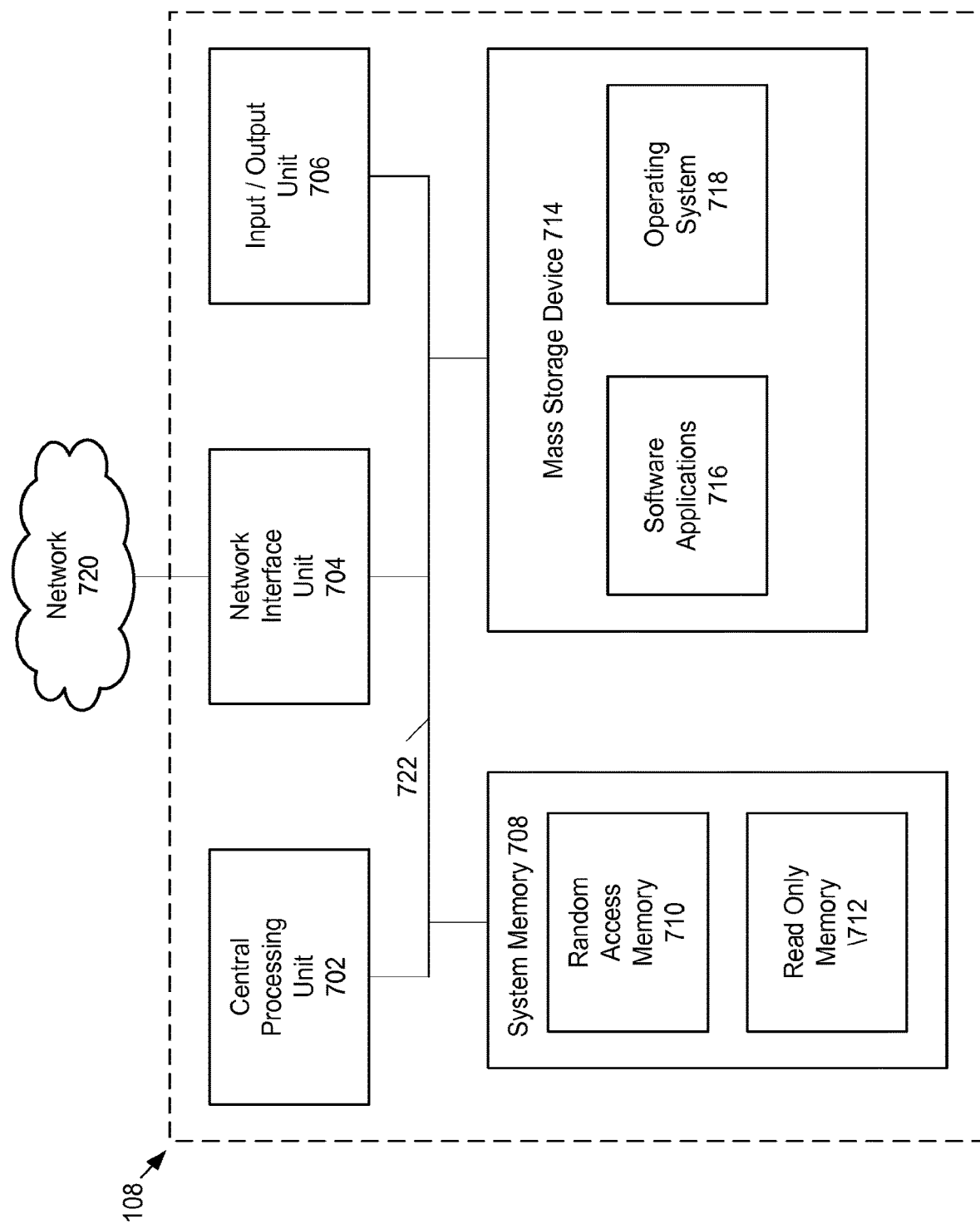

MESSAGE CONTENT CLEANSING

BACKGROUND

Larger organizations can receive and process millions of messages each day. Many of these messages can include content that can be significant to the organizations. Other messages can include content that the organizations can safely ignore. Federal regulations require that certain types of messages, for example complaints from customers, be processed and responded to within a specific period of time, for example 30 days. Failure to comply with the federal regulations can result in significant fines for an organization.

Because of volume, some organizations use automated processes for incoming messages. The automated processes can result in a lot of false positives. The false positives can result in wasted resources for the organization.

SUMMARY

Embodiments of the disclosure are directed to an electronic computing device comprising: a processing unit; and system memory, the system memory including instructions which, when executed by the processing unit, cause the electronic computing device to: monitor a message to determine whether a response is required based on message compliance regulations, the monitoring of the message comprising: automatically identify one or more parts of the message that are not relevant to the monitoring of the message based on the message compliance regulations; automatically exclude the one or more parts of the message that are not relevant from the monitoring of the message based on the message compliance regulations; and identify content in a part of the message that is not excluded from the monitoring of the message that can indicate that a response is required based on the message compliance regulations; and when the content that can indicate that a response is required based on the message compliance regulations is discovered in the part of the message that is not excluded from the monitoring of the message, automatically designate the message for further analysis.

In another aspect, a method implemented on an electronic computing device for testing source code of a software application to identify security vulnerabilities in the software application comprises: on the electronic computing device, automatically identifying one or more parts of an email message that are not relevant to the monitoring of the email message for violations based on the email compliance regulations; automatically excluding the one or more parts of the email message that are not relevant from the monitoring of the email message based on the email compliance regulations; identifying one or more keywords or phrases in a part of the email message that is not excluded from the monitoring of the email message; and checking the email message for the one more keywords or phrases; and when one or more of the keywords or phrases are discovered in the part of the email message that is not excluded from the monitoring of the email message, automatically designate the email message for further analysis.

In yet another aspect, an electronic computing device includes a processing unit; and system memory, the system memory including instructions which, when executed by the processing unit, cause the electronic computing device to: monitor an email message to determine whether a response is required based on email compliance regulations, the monitoring of the email message comprising: automatically identify one or more parts of the email message that are not relevant to the monitoring of the email message based on the email compliance regulations, the one or more parts including one or more of a signature block, a uniform resource locator (URL), a disclaimer and one or more echoes of previous emails in the email message, the one or more parts being identified using one or more machine learning algorithms, the one or more machine learning algorithms including one or more unsupervised learning algorithms and one or more supervised learning algorithms; automatically exclude the one or more parts of the email message that are not relevant from the monitoring of the email message based on the email compliance regulations; automatically identify one or more keywords or phrases in a part of the email message that is not excluded from the monitoring of the email message, the one or more keywords or phrases indicating possible action that needs to be taken to comply with the email compliance regulations; automatically identify a start and end position in the email message for each part of the email message identified to be relevant; and check the email message for the one more keywords or phrases; and when one or more of the keywords or phrases are discovered in the part of the email message that is not excluded from the monitoring of the email message, automatically designate the email message for further analysis.

The details of one or more techniques are set forth in the accompanying drawings and the description below. Other features, objects, and advantages of these techniques will be apparent from the description, drawings, and claims.

DESCRIPTION OF THE DRAWINGS

FIG. 3 shows an example structure of an email message that includes echo items, signature blocks, uniform resource locators (URLs) and disclaimers.

FIG. 5 shows an example structure of a logo, cities string and disclaimer from the email message of FIG. 3.

FIG. 7 shows example physical components of the email server computer of FIG. 1.

DETAILED DESCRIPTION

Figure 1:
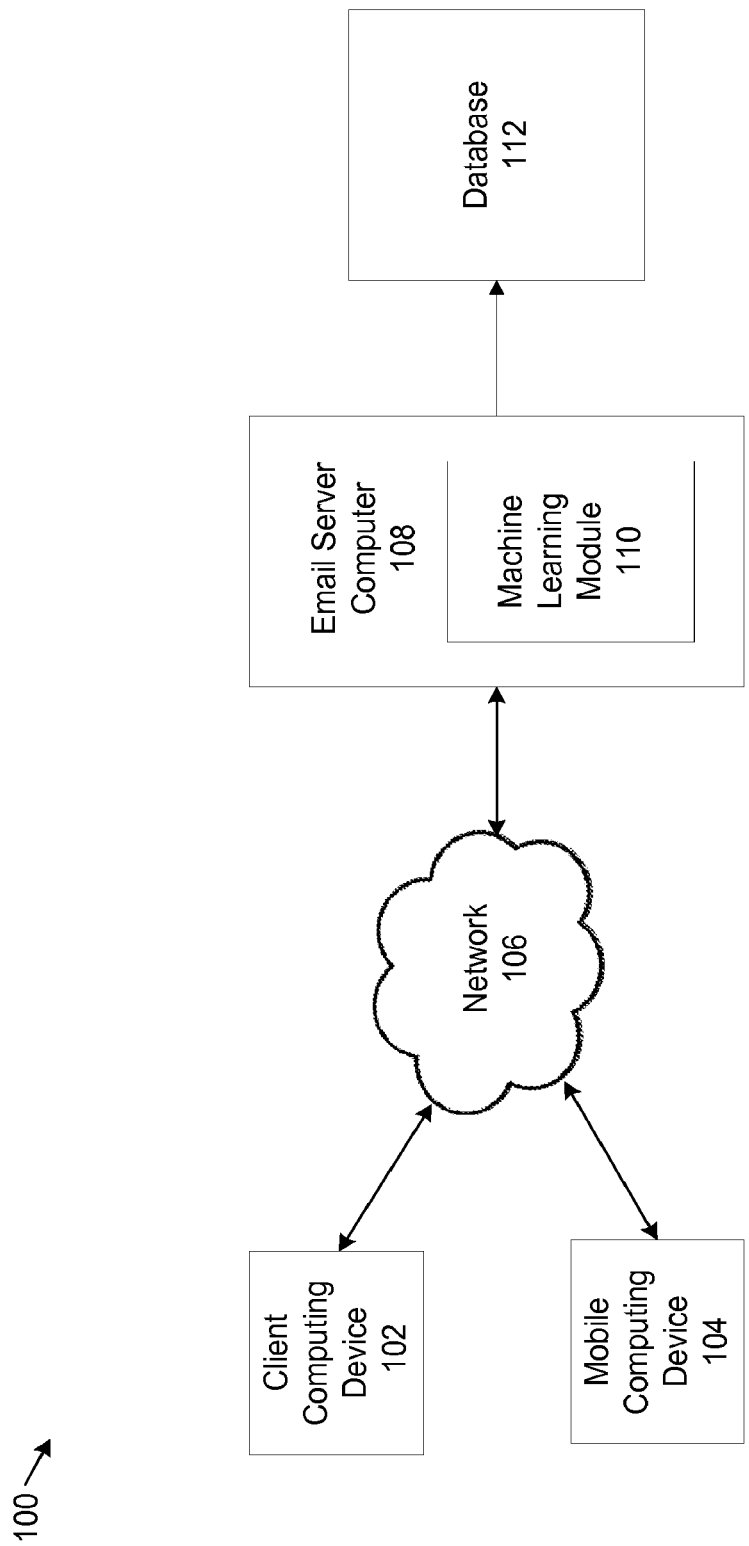
FIG. 1 shows an example system that supports email content cleansing.

The present disclosure is directed to systems and methods that can automatically cleanse messages of certain content, thereby permitting a body of a message to be automatically analyzed. The content that is cleansed can include reused contents such as signature blocks and disclaimers, echoes and URLs. As used in this disclosure, a disclaimer is a legal or privacy statement intended to protect a person or an organization from liability or loss. As used in this disclosure, an echo in a message comprises content of previous messages that are included in the message as a result of replies and forwards. Other content that can be cleansed is possible.

In the examples provided below, the messages are described as email messages. However, the systems and methods described herein are applicable to other types of messages and communications. For example, messages such as instant messages and text messages can also be cleansed in the manners described herein.

Items such as signature blocks, disclaimers, echoes and URLs can be considered to be noise items because these items do not include new content in the email message. Noise items such as signature block, disclaimers, echoes and URLs can be a source of false alerts when analyzing emails for compliance with federal regulatory email compliance rules.

Under regulatory rules, organizations such as financial service organizations are required to monitor all incoming and outgoing internal electronic communications such as email to identify messages containing solicitations and executions of security transactions, client complaints, employee misconduct and other suspicious activities such as insider trading. Federal regulatory bodies such as the Security and Exchange Commission (SEC) and self-regulatory organizations such as the Financial Industry Regulatory Authority (FINRA) can impose steep fines, sometimes multi-million dollar fines and judgments on financial service organizations that mismanage email content, have inadequate record retention policies and procedures in place or fail to turn over subpoenaed email in a timely and legally-complaint manner.

The systems and methods provide for analyzing email messages received by an organization and identifying items such as signature blocks, disclaimers, echoes and URLs in the email messages. Once these items are identified, they are effectively removed from the email messages, leaving only a subset of the email message that includes new content. The subset of the email message that includes new content, referred to in this disclosure as the body of the email message, is then monitored to detect keywords or phrases that can flag the email message for further analysis. By only monitoring the body of an email message and not monitoring sections of the email message that contain noise items such as signature blocks, disclaimers, echoes and URLs, detection of false positives in the email message can be minimized.

The systems and methods use a form of machine learning to detect noise items in an email message. The machine learning makes use of a set of rules established by using one more analysis techniques such as stratified sampling, email content segmentation, support vector machine classifier, Naïve Bayes classifier, n-gram and cluster analysis. Once the noise items are detected and a remaining body of an email message is analyzed, results of the analysis are reviewed to validate the analysis. In some implementations, the results of the analysis can be manually reviewed by a human. When the set of rules for the machine learning are validated, the set of rules can be applied to a larger set of emails. In some implementations, in addition to or in lieu of a manual review, machine learning algorithms can be automatically applied to the body of the email message to determine whether noise items can still be detected.

The systems and methods disclosed herein are directed to a computer technology that solves an existing problem in automatically analyzing email messages to identify email messages that may require an immediate action to comply with email compliance regulations. Some organizations can receive large numbers of emails per day. These emails need to be analyzed in order to avoid potentially expensive fines for non-compliance with the regulations. The machine learning algorithms and the training of these algorithms can improve the speed of the analysis and reduce the amount of computer processing time needed to identify significant emails that require attention.

In addition to email, the systems and method can be used to analyze documents containing diverse kinds of data. Using the machine learning algorithms, the different types of data can be automatically classified and segmented so that a summary of the different types of data can be automatically provided. Other applications using the systems and methods are possible.

FIG. 1 shows an example system 100 that supports email content cleansing. The system 100 includes a client computing device 102, a mobile computing device 104, a network 106, an email server computer 108 and a database 112. The email server computer 108 includes a machine learning module. More or fewer of client computing device 102, mobile computing device 104 and email server computer 108 and database 112 are possible.

The example client computing device 102 is a desktop computer or laptop computer that can connect to email server computer 108 over network 106. Email messages for a user at client computing device 102 can be obtained from email server computer 108 using an email application on client computing device 102. More than one client computing device 102 can be used.

The example mobile computing device 104 is a tablet computer or smartphone that can connect to email server computer 108 over network 106. Email messages for a user at mobile computing device 104 can be obtained from email server computer 108 using an email application on mobile computing device 104. More than one mobile computing device 104 can be used.

The example network 106 is computer network that can permit communication between one or more of client computing device 102, mobile computing device 104 and email server computer 108. Network 106 can comprise a corporate Intranet and network 106 can also include the Internet.

The example email server computer 108 is a server computer that processes and forwards emails over network 106. The email server computer 108 can forward emails to client computing device 102 and mobile computing device 104 and can also receive emails from client computing device 102 and mobile computing device 104 and forward the emails to other email server computers. The email server computer 108 includes a machine learning module 110.

The example machine learning module 110 can analyze email messages received at email server computer 108, identify noise items such as signature blocks, disclaimers, echoes and URLs and remove the noise items from an analysis of the body of the email message. The email server computer 108 can then scan the body of the email message for keywords or phrases that can flag the email message for further analysis. As discussed in more detail later herein, the machine learning module 110 can include algorithms that can be trained and adjusted based on data from previous emails. For example, disclaimers can be very specific to an organization. The machine learning module 110 can be trained to identify one or more disclaimers for an organization in the email message.

The example database 112 can include storage for a plurality of email messages that can be analyzed to train the algorithms in the machine learning module 110. The database 112 can also store one or more signature blocks, disclaimers, URLs, etc. that the algorithms can use to detect patterns in the mail messages. Other or different items can be stored in the database 112. The database 112 can comprise one or more databases that can be located in one or more geographical locations.

Figure 2:
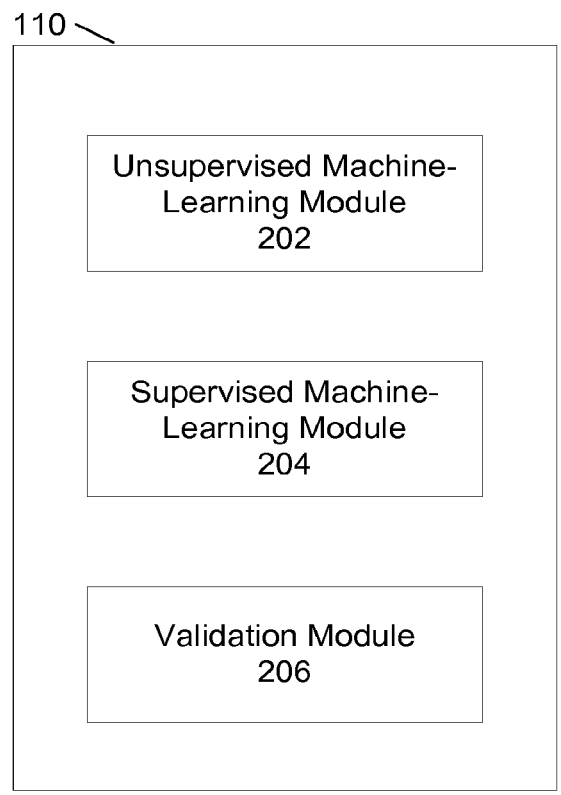
FIG. 2 shows example modules of the machine learning module of FIG. 1.

FIG. 2 shows example modules of the machine learning module 110. The machine learning module 110 includes an unsupervised machine learning module 202, a supervised machine learning module 204 and a validation module 206. More, fewer or different modules can be used.

The example unsupervised machine learning module 202 attempts to identify noise items such as signature blocks, disclaimers, echoes and URLs in an email message without any specific guidance from a user or organization. In an example implementation, the unsupervised machine learning module 202 can use an n-gram unsupervised machine-based algorithm. The n-gram algorithm can automatically look for multiple occurrences of one or more words and phrases in sample email messages. Some examples of multiple words and phrases that can be detected are "Sent," "From", "To" and "Subject" which can identify a header of an email message and "Telephone" followed by a number, "Fax" followed by a number, "Mobile" followed by a number, "Email" followed by a text string that includes an "@" symbol and "www" followed by a period and a text string, which can indicate part of a signature block for an email message. Other occurrences that can be detected can include a string of city names separated by a "|" symbol, which can identify corporate offices of an organization as part of a signature block. Other words and phrases are possible. One specific example of an n-gram algorithm than can be used is k-means clustering, which attempts to partition n observations into k clusters. Other types of unsupervised machine learning algorithms are possible.

When words repeat a number of times in a pattern, the unsupervised machine learning module 202 can determine that these words are not part of text created by a human, but instead is text such as a signature block or disclaimer that is part of an echo in an email message. For example, a paragraph having a name, an address and a phone number can be determined to be part of the signature block.

Based on a detection of a pattern, the unsupervised machine learning module 202 can develop rules to look for similar patterns. The rules can be applied to emails in a larger data set. In an iterative process, mistakes can be made and the unsupervised machine learning module 202 can learn from the mistakes and modify the rules.

During or after using the unsupervised machine learning algorithms, the unsupervised machine learning module 202 can attempt to identify specific types of noise items from the words and phrases detected in the email messages. For example, the unsupervised machine learning module 202 can indicate that the words and phrases identify one or more noise items such as a signature block, disclaimer, echo and URL in the email messages. After the unsupervised machine learning module 202 identifies specific types of noise items, one or more supervised machine learning algorithms can attempt to identify a location for the noise items in the email messages.

The example supervised machine learning module 204 uses organization specific information about the noise items to develop rules to further identify the noise items and to identify start and stop locations for the noise items in the email messages. The development of rules can train algorithms in the supervised machine learning module 204 to identify the noise items using a rules-based review of the email messages. For example, the organization specific information can specify an exact content and syntax of a disclaimer in the email message. As another example, the organization specific information can specify a structure of a signature block for the organization. The example structure can include an individual name on one line of the email message, followed by a title on a next line, followed by an address, followed by a telephone number, fax number, email address, organization URL, organization slogan, cities in the organization and a disclaimer. Other syntaxes are possible. The supervised machine learning module 204 can use the organization specific information to identify a location for each noise item in the email messages scanned.

In an example implementation, the supervised machine learning module 204 can include a Naïve Bayes classifier. The Naïve Bayes classifier can assign class labels to instances of a data set based on a maximum likelihood that a data item can have a particular classification. So for example, based on the organization specific information, the Naïve Bayes classifier can determine that an item such as an address can be classified as part of a signature block and that a string of text can be classified as part of a disclaimer.

The supervised machine learning module 204 can also include a support vector machine. The support vector machine can analyze data items in an email message, recognize patterns in the data items and classify the data items. The support vector machine can use the organization specific information to establish categories for the data items and build a model that can assign scanned data from the email message into an appropriate category. Example categories that can be established can include signature block, disclaimer, echo and URL. Other categories are possible.

The example validation module 206 can run one or more automated tests that can attempt to validate that noise items have been removed from an email message. In one implementation, the validation module 206 can analyze an email message after the email message has been processed by the unsupervised machine learning module 202 and the supervised machine learning module 204. The validation module 206 can verify that the processed email message no longer contains the noise items in the unprocessed email message. When the validation module 206 verifies that a plurality of processed email messages no longer contain noise items, the validation module can validate that algorithms of the unsupervised machine learning module 202 and the supervised machine learning module 204 have been trained to sufficiently remove noise items from email messages. At this point, the algorithms can be used to analyze new incoming messages and to effectively remove noise items from the new incoming messages.

In some implementations a manual means of validation can be used in addition to or in lieu of the validation module 206. Manual validation can comprise review by a human of results of email processing by the unsupervised machine learning module 202 and the supervised machine learning module 204. Whereas the validation module 206 can attempt to automatically validate the algorithms used to process the email messages, the automatic validation is not always accurate. However, a human can determine with a very high degree of accuracy whether all noise items have been removed from the email messages. Because manual validation is very time intensive and expensive and because of the high volume of email messages received by an organization, only a relatively small sample of email messages is typically used for manual validation. However, the small sample can be effective in validating the algorithms used to process the email messages.

FIG. 3 shows an example structure of an email message thread 300 that includes noise items including echoes, signature blocks, URLs and disclaimers. The example email message thread 300 comprises a body of a new message content 310 and echo content 334 from two previous email messages.

As shown in FIG. 3, the example email message thread 300 includes an area of new message content 310. After noise elements are removed from the email message thread 300, the new message content 310 can be scanned to determine if there is content in the new message content 310 that would warrant further analysis, as discussed earlier herein.

The new message content 310 is preceded by an address header that includes a sent field 302, a from field 303, a to field 304, a cc field 306 and a subject field 308. As shown, the subject field 308 includes a subject title "Discussion" which is preceded by a prefix "RE." The prefix "RE" indicates that the new message content 310 represents a response to previous email messages in an email thread, indicating that there is echo content to be removed from the email thread. The sent field shows a date and time in which the most recent email message in the email message thread 300 was sent.

A signature block 332 follows the new message content 310. The example signature block 332 includes a name field 312, a title field 314, an address field 316, a telephone number field 318, a fax number field 320, an email address field 322, a URL field 324, a logo 326, a cities field 328 and a disclaimer field 330. More, fewer or different fields for the signature block 332 are possible. The example URL field 324 represents a URL of an organization corresponding to the sender of the new message content 310. The logo 326, cities field 328 and disclaimer field 330 are discussed in more detail later herein. The echo content 334 corresponds to forwards and replies associated with the email thread, as described next herein.

Figure 4:
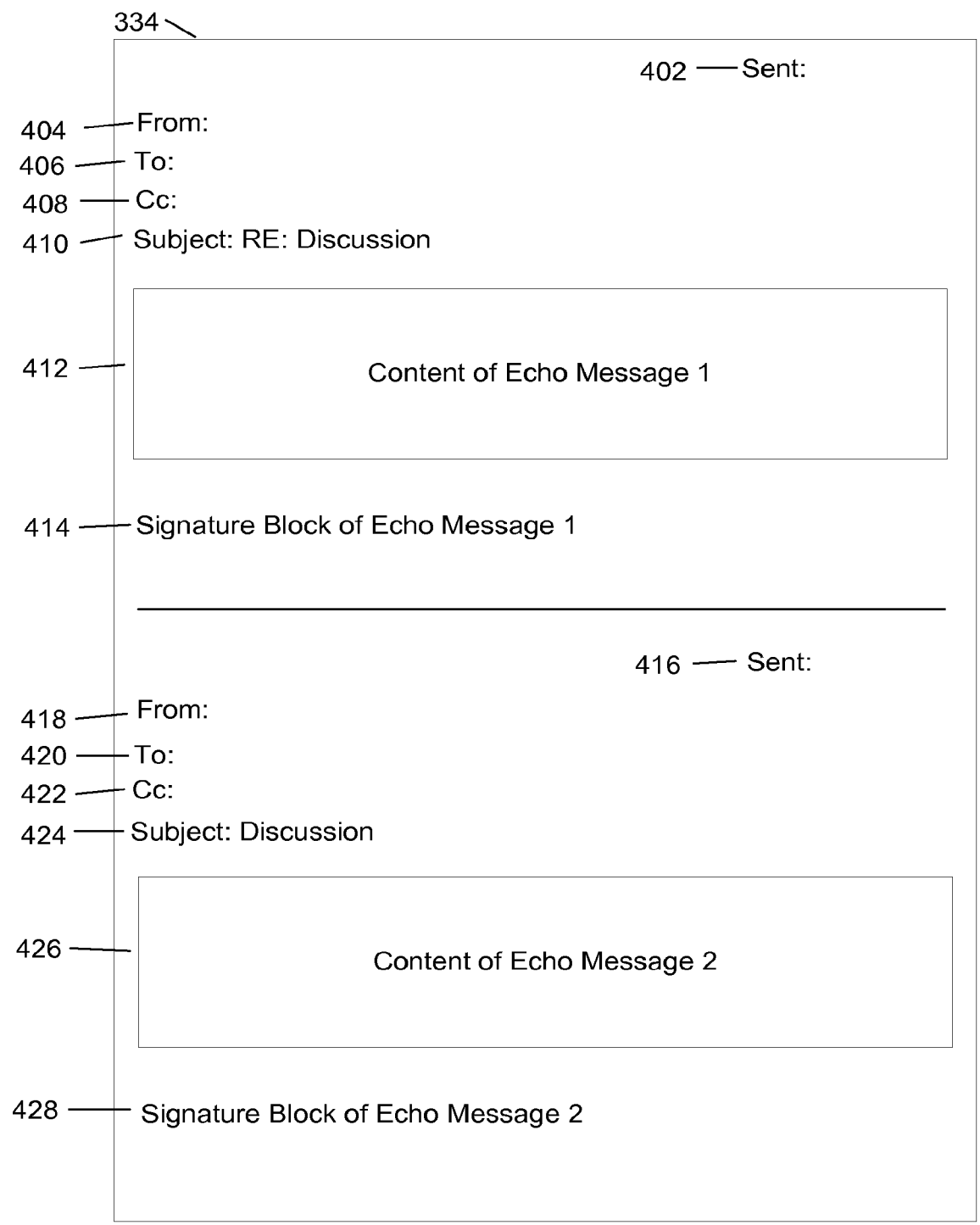
FIG. 4 shows an example structure of an echo item of FIG. 3.

FIG. 4 shows an example structure of the echo content 334 of the email message thread 300. The example echo content 334 shows that there are two additional email messages in the email thread. The email message immediately preceding the new message content 310 is shown first, followed by a first email message in the email thread.

The email message immediately preceding the new message content 310 contains an example header that includes a sent field 402, a from field 404, a to field 406, a cc field 408 and a subject field 410. The sent field 402 shows a date and time in which the email message that immediately precedes the email message in which the new message content 310 was sent. The subject field 410 includes a RE prefix indicating that this email message is a reply to a previous email message in the email message thread 300. The echo message 1 field 412 shows the content of the email message that immediately precedes the email message in which the new message content 310 was sent.

Signature block 414 of echo message 1 follows next. In some implementations, particularly if the email message for signature block 414 comes from the same organization as the email message for signature block 332, signature block 414 can have the same format and structure as signature block 332. In other implementations, particularly when the email message for signature block 414 originates at a different organization of the email message for signature block 332, the format and structure of signature block 414 can be different that the format and structure of signature block 332. In particular, the logo 326, cities field 328 and disclaimer field 330 fields are usually different.

The next example echo in echo content 334 comprises a header, message content and signature block of the first email in the email message thread 300. The header includes a sent field 416, a from field 418, a to field 420, a cc field 422 and a subject field 424. The subject field 424 appears without a RE or FW prefix, indicating that the email message corresponding to the subject field 424 is the first email in the email message thread 300. In general a RE prefix in the subject field can indicate the email corresponding to the subject field is a reply to a previous email in the email message thread 300. A FW prefix in the subject field can indicate that the email corresponding to the subject field is being forwarded.

The message content of the first email in the email message thread 300 comprises content field 426 of echo message 2. This content field 426 was previously analyzed when the first email was originally sent. Because this content field 426 was previously analyzed, the content field 426 now comprises echo content. The signature block 428 of echo message 2 can be of similar structure and format as for signature block 332 or the signature block 430 can be of a different structure and format, as discussed earlier herein regarding signature block 414.

FIG. 5 shows details on the logo 326, cities field 328 and disclaimer field 330 from FIG. 3. The example logo 326 is a logo from an organization, including a registered trademark symbol ® at the end of the logo. The logo 326 appears in the signature block 332 of the logo and is included in every email sent by an employee of the organization that uses the signature block 332. Algorithms in the unsupervised machine learning module 202 can detect that the exact words and syntax of the logo 326 are found more than once in the email message thread 300, indicating that the logo 326 is part of an echo of the email message thread 300. In addition, when the exact syntax of the logo 326 is provided to the supervised machine learning module 204, the supervised machine learning module 204 can identify the logo 326 and determine a start and stop position for each occurrence of the logo 326 in the email message thread 300.

The example cities field 328 is a line in the signature block 332 that lists cities in which the organization has offices. The example disclaimer field 330 is a text message that disclaims or clarifies certain aspects of the email message thread 300. Similar to the logo 326, the unsupervised machine learning module 202 can detect that the exact words and syntax of the cities field 328 and the disclaimer field 330 are found more than once in the email message thread 300, indicating that the cities field 328 and the disclaimer field 330 are part of an echo of the email message thread 300. In addition, when the exact syntax of the cities field 328 and the disclaimer field 330 are provided to the supervised machine learning module 204, the supervised machine learning module 204 can determine a start and stop position for each occurrence of the cities field 328 and the disclaimer field 330 in the email message thread 300.

Figure 6:
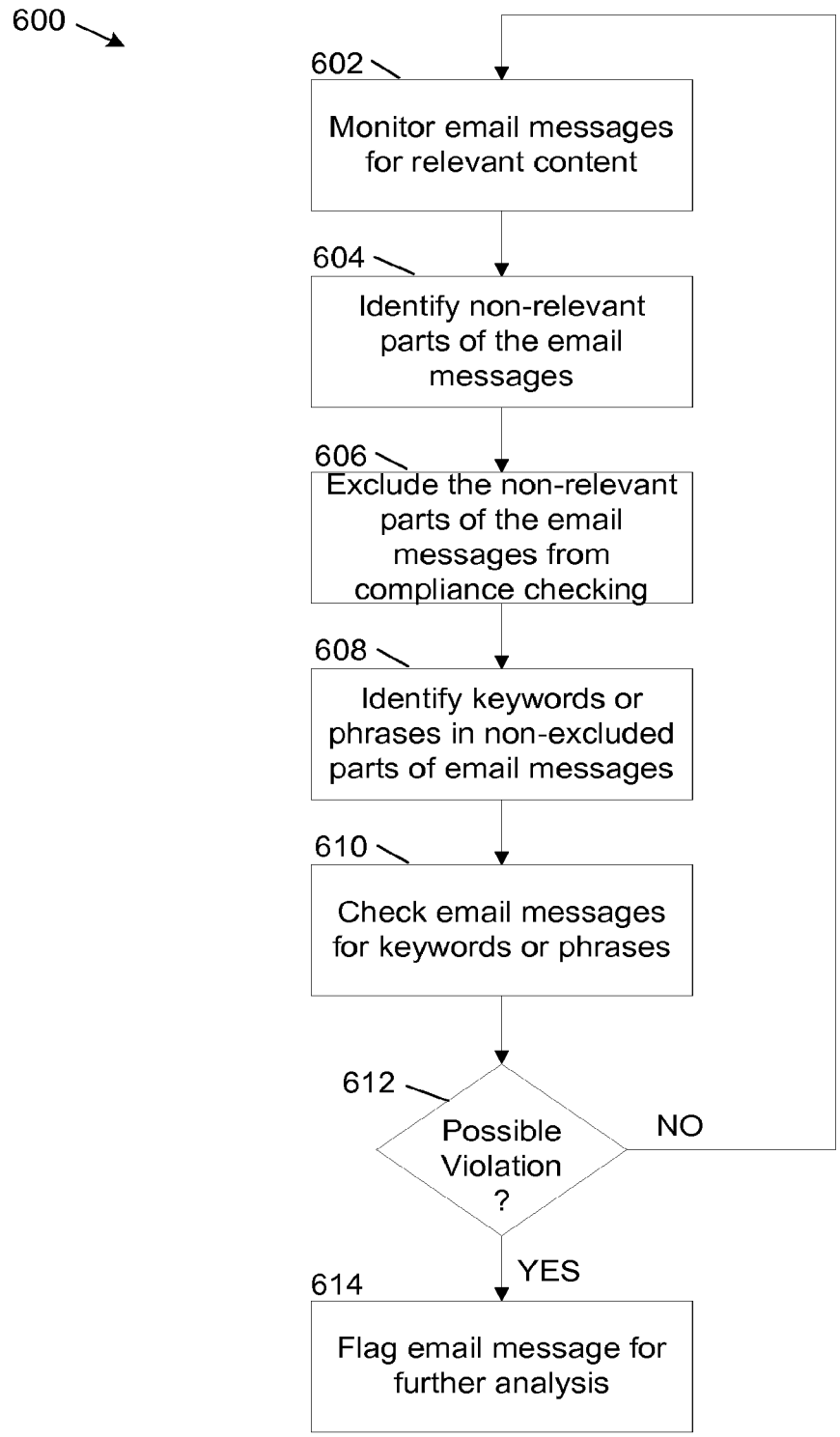
FIG. 6 shows a flowchart of an example method for automatically checking email messages of an organization for possible violations of email compliance rules.

FIG. 6 shows a flowchart of an example method 600 for automatically checking email messages of an organization for content that can indicate that an action is required to be taken based on email compliance regulations. The method 600 monitors the email messages, identifies irrelevant noise items in the email messages and excludes the irrelevant noise items from a check for words and phrases in the email messages that can indicate that the action needs to be taken.

The action to be taken is dependent of the content of the email message. For example, for a customer complaint, the action can be to respond to the customer within a specific period of time. For an indication of employee misconduct, the action can be to arrange a meeting with the employee. For an indication that a large security transaction was made, an action can be to investigate that the security transaction was properly made. Other actions can be taken depending on the content in the body of the email message.

At operation 602, email messages are monitored for relevant content. The email messages to be monitored can be email messages that are received at an organization email server, for example email server computer 108, or email messages that are obtained from a database, for example database 112. As discussed earlier herein, the email messages can include content that is not relevant to a check for compliance with email regulations. The non-relevant content, also referred to herein as noise items, can include echoes from previous emails, signature blocks, disclaimers and URLs.

At operation 604, the non-relevant parts of the email messages are identified. For method 600, the non-relevant content is identified using machine learning algorithms in the email server. As discussed earlier herein, the machine learning algorithms can include unsupervised machine learning algorithms such as n-gram and supervised machine learning algorithms such as a Naïve Bayes classifier.

At operation 606, the non-relevant parts of the email messages are excluded from the checking for compliance with email regulations. The machine learning algorithms can identify start and stop points for each non-relevant item and these non-relevant items can either be removed from an analysis of the email messages or bypassed during the analysis of the email messages.

At operation 608, keywords or phrases are identified in the non-excluded relevant parts of the email messages. The keywords or phrases can indicate an issue with the email that may need to be responded to promptly. Examples of keywords or phrases that can indicate an issue can be complaint, subpoena, mismanagement, employee misconduct, loss of money, security purchase, unresponsive, dissatisfied, untrustworthy, close my accounts and unhappy. Other keywords and phrases are possible.

At operation 610, the email messages are checked to determine if the email messages contain any of the identified words or phrases from operation 608.

At operation 612, based on an occurrence of one or more of the identified words or phrases, a check is made as to whether there is a possibility for a violation of email compliance regulations in an email message.

At operation 612, when a determination is made that there is a possibility for a violation of email compliance regulations in an email message, at operation 614, the email message is flagged for further analysis. In some implementations, further analysis can comprise a manual analysis of the email by organization personnel. In some implementations, another automatic analysis of the email message can be performed before or in lieu of the manual analysis.

At operation 612, when a determination is made that there are no keywords or phrases in the email message that would be indicative of a possible violation of email compliance regulations, control advances to operation 602 and another email message is monitored.

As illustrated in the example of FIG. 7, email server computer 108 includes at least one central processing unit ("CPU") 702, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the email server computer 108, such as during startup, is stored in the ROM 712. The email server computer 108 further includes a mass storage device 714. The mass storage device 714 is able to store software instructions and data. Some or all of the components of the email server computer 108 can also be included in client computing device 102 and mobile computing device 104.

The mass storage device 714 is connected to the CPU 702 through a mass storage controller (not shown) connected to the system bus 722. The mass storage device 714 and its associated computer-readable data storage media provide non-volatile, non-transitory storage for the email server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the email server computer 108.

According to various embodiments of the invention, the email server computer 108 may operate in a networked environment using logical connections to remote network devices through the network 720, such as a wireless network, the Internet, or another type of network. The email server computer 108 may connect to the network 720 through a network interface unit 704 connected to the system bus 722. It should be appreciated that the network interface unit 704 may also be utilized to connect to other types of networks and remote computing systems. The email server computer 108 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the email server computer 108 can store software instructions and data. The software instructions include an operating system 718 suitable for controlling the operation of the email server computer 108. The mass storage device 714 and/or the RAM 710 also store software instructions, that when executed by the CPU 702, cause the email server computer 108 to provide the functionality of the email server computer 108 discussed in this document. For example, the mass storage device 714 and/or the RAM 710 can store software instructions that, when executed by the CPU 702, cause the email server computer 108 to display received data on the display screen of the email server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An electronic computing device, comprising:
a processing unit; and
system memory, the system memory including instructions which, when executed by the processing unit, cause the electronic computing device to:

use one or more machine learning algorithms to:
  identify noise items in a message, wherein the one or more machine learning algorithms include an unsupervised machine learning algorithm, wherein the unsupervised machine learning algorithm identifies the noise items in the message, including to:
    develop one or more rules to look for patterns in the message;
    conduct an iterative process to learn from mistakes associated with looking for the patterns in the message and modify the one or more rules to create one or more modified rules; and
    using the one or more modified rules, identify the noise items in the message;
  identify start and stop locations for the noise items within the message using a supervised machine learning algorithm of the machine learning algorithms; and
  identify content in the message that requires a response; and
  when the content that requires the response is located outside of the start and stop locations of the noise items in the message, automatically designate the message for further analysis.

2. The electronic computing device of claim 1, wherein the one or more machine learning algorithms use organization-specific information for an organization to identify the noise items, wherein the organization-specific information includes a disclaimer message used by the organization.

3. The electronic computing device of claim 1, wherein the one or more machine learning algorithms are programmed to:
  identify words that repeat multiple times in a pattern across messages;
  identify that the words include a name in a first line, an address in a second line next to the first line, and a phone number in a third line next to the second line; and
  determine that the words are part of the noise items.

4. The electronic computing device of claim 1, wherein identifying the content in the message that requires the response includes to monitor the message based on email compliance rules.

5. The electronic computing device of claim 1, wherein identifying the content in the message that requires the response includes to identify one or more echoes of earlier messages in the message.

6. The electronic computing device of claim 5, wherein the message is an email message, and identifying the one or more echoes of earlier messages in the message includes to identify one or more symbols indicating replies and forwards in the email message.

7. The electronic computing device of claim 1, wherein the one or more machine learning algorithms include one or more of n-gram and k-means clustering and a Naïve Bayes classifier.

8. The electronic computing device of claim 1, wherein the content that requires the response relates to a customer complaint or employee misconduct.

9. The electronic computing device of claim 1, wherein the content that requires the response relates to regulatory compliance rules.

10. A method implemented on an electronic computing device, the method comprising:
  using one or more machine learning algorithms:
    identifying noise items in a message, wherein the one or more machine learning algorithms include an unsupervised machine learning algorithm, wherein the unsupervised machine learning algorithm identifies the noise items in the message, including:
      developing one or more rules to look for patterns in the message;
      conducting an iterative process to learn from mistakes associated with looking for the patterns in the message and modify the one or more rules to create one or more modified rules; and
      using the one or more modified rules, identifying the noise items in the message;
    identifying start and stop locations for the noise items within the message using a supervised machine learning algorithm of the machine learning algorithms; and
    identifying content in the message that requires a response; and
  when the content that requires the response is located outside of the noise items in the message, automatically designating the message for further analysis.

11. The method of claim 10, wherein the one or more machine learning algorithms use organization-specific information for an organization to identify the noise items, wherein the organization-specific information includes a disclaimer message used by the organization.

12. The method of claim 10, wherein the one or more machine learning algorithms are programmed to:
  identify words that repeat multiple times in a pattern across messages;
  identify that the words include a name in a first line, an address in a second line next to the first line, and a phone number in a third line next to the second line; and
  determine that the words are part of the noise items.

13. The method of claim 10, wherein identifying the content in the message that requires the response includes monitoring the message based on email compliance rules.

14. The method of claim 10, wherein identifying the content in the message that requires the response includes identifying one or more echoes of earlier messages in the message.

15. The method of claim 14, wherein the message is an email message, and identifying the one or more echoes of earlier messages in the message includes identifying one or more symbols indicating replies and forwards in the email message.

16. The method of claim 10, wherein the one or more machine learning algorithms include one or more of n-gram and k-means clustering and a Naïve Bayes classifier.

17. The method of claim 10, wherein the content that requires the response relates to a customer complaint or employee misconduct.

18. The method of claim 10, wherein the content that requires the response relates to regulatory compliance rules.

* * * * *